(12) United States Patent
Qiu

(10) Patent No.: US 10,310,220 B2
(45) Date of Patent: Jun. 4, 2019

(54) DUAL-LENS MODULE AND APPARATUS HAVING SAME

(71) Applicant: Haiyang Qiu, Shenzhen (CN)

(72) Inventor: Haiyang Qiu, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 0 days.

(21) Appl. No.: 15/415,959

(22) Filed: Jan. 26, 2017

(65) Prior Publication Data

US 2018/0164543 A1 Jun. 14, 2018

(30) Foreign Application Priority Data

Dec. 10, 2016 (CN) .................... 2016 2 1353891 U

(51) Int. Cl.
*G02B 13/00* (2006.01)
*H04N 5/232* (2006.01)
*G02B 7/02* (2006.01)
*H04N 5/225* (2006.01)

(52) U.S. Cl.
CPC ............ *G02B 13/003* (2013.01); *G02B 7/021* (2013.01); *G02B 7/022* (2013.01); *G02B 13/0045* (2013.01); *H04N 5/2251* (2013.01); *H04N 5/23296* (2013.01)

(58) Field of Classification Search
None
See application file for complete search history.

(56) References Cited

U.S. PATENT DOCUMENTS

2016/0182821 A1* 6/2016 Shabtay ............... H04N 5/2258
348/239

* cited by examiner

*Primary Examiner* — Jennifer D. Carruth
(74) *Attorney, Agent, or Firm* — Na Xu; IPro, PLLC

(57) ABSTRACT

A dual-lens module and apparatus having the same is provided in the present disclosure. The dual-lens module, comprising a lens tube with a receiving space and a lens set disposed in the lens tube, wherein the receiving space comprises a first receiving space and a second receiving space which are independent from each other, the lens set comprises a first lens set and a second lens set, the first lens set is installed in the first receiving space, the second lens set is installed in the second receiving space, and the optical axis of the first lens set is parallel to that of the second lens set and the both move synchronously.

9 Claims, 2 Drawing Sheets

DUAL-LENS MODULE AND APPARATUS HAVING SAME

FIELD OF THE DISCLOSURE

The present disclosure relates to the technical field of camera lenses and, particularly, to a dual-lens module and apparatus having the same.

BACKGROUND

The functions of existing apparatus are increasingly strong, photographing (self-photographing) of the apparatus has gradually become a common application mode, and the requirements for the photographing effect and quality of the apparatus are increasingly high. The lens tube of the existing apparatus can only hold a single set of lens, the photographing range is limited, particularly, when a thin and high or wide object is photographed, the whole object cannot be completely photographed without changing the focal length, only part of an image can be captured, and if the focal length is changed, the definition of the obtained image may be lowered.

Therefore, it is desired to provide a dual-lens module and apparatus having the same to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
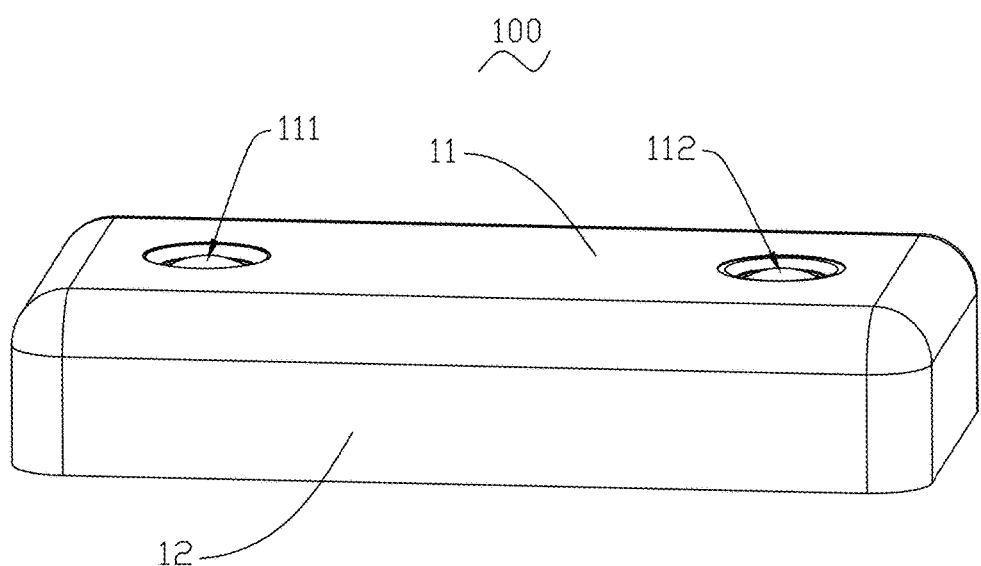
FIG. 1 is a structural schematic diagram of a dual-lens module provided by the present disclosure.
Figure 2:
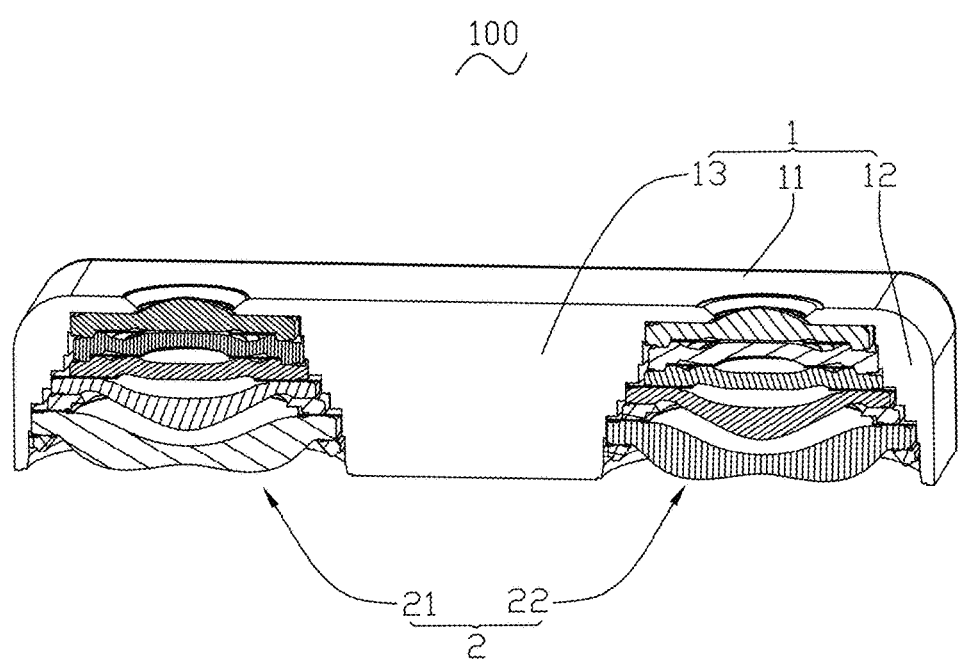
FIG. 2 is a cross-sectional view of the dual-lens module shown in FIG. 1.

As shown in FIGS. 1-2, a dual-lens module 100 includes a lens tube 1 with a receiving space (not marked) and a lens set 2 disposed in the lens tube 1. The receiving space includes a first receiving space (not marked) and a second receiving space (not marked) which are independent from each other. Specifically, the lens tube 1 includes a first tube wall 11 extended in the horizontal direction, a second tube wall 12 bent and extended from the circumference of the first tube wall 11 and encircling the receiving space together with the first tube wall 11, and a third tube wall 13 bent and extended from the middle part of the first tube wall 11 and dividing the receiving space into the first receiving space and the second receiving space. Preferably, the third tube wall 13 divides the receiving space into two symmetrical parts, i.e., the size and the contour of the first receiving space and the second receiving space are same. The first tube wall 11 is provided with a first light transmission hole 111 and a second light transmission hole 112 opposite to the first receiving space and the second receiving space respectively. The first light transmission hole 111 and the second light transmission hole 112 are formed symmetrically at interval.

The lens set 2 includes a first lens set 21 and a second lens set 22. The first lens set 21 is installed in the first receiving space, and the second lens set 22 is installed in the second receiving space. The first lens set 21 abuts against the first tube wall and/or the second tube wall 12 and/or the third tube wall 13, and the second lens set 22 abuts against the first tube wall and/or the second tube wall 12 and/or the third tube wall 13. The optical axis of the first lens set 21 is parallel to that of the second lens set 22 and the both move synchronously. Preferably, the first lens set 21 and the second lens set 22 are disposed symmetrically about the central axis of the third tube wall 13. Further, the structures of the first lens set 21 and the second lens set 22 are same.

Meanwhile, the present disclosure further discloses apparatus, including a housing, a main control circuit board received in the housing and the above dual-lens module, wherein the dual-lens module is electrically connected with the main control circuit board. The apparatus includes a mobile phone, a tablet computer, a notebook computer, etc., and is preferably a mobile phone.

Compared with the prior art, the dual-lens module provided by the present disclosure has the advantages that the first receiving space and the second receiving space which are independent from each other are disposed in the lens tube, the first lens set is installed in the first receiving space, the second lens set is installed in the second receiving space, the optical axis of the first lens set is parallel to that of the second lens set and the both move synchronously, and the first lens set and the second lens set move synchronously for photographing, so that the photographing range can be enlarged without adjusting the focal length, users can conveniently photograph objects with different height-width ratios, and the photographing quality can also be guaranteed.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A dual-lens module, comprising:
a single only piece lens tube with a dual receiving space, and
a dual lens set disposed in the lens tube,
wherein the dual receiving space comprises a first receiving space and a second receiving space which are independent from each other, the dual lens set comprises a first lens set and a second lens set, the first lens set is installed in the first receiving space, the second lens set is installed in the second receiving space, and the optical axis of the first lens set is parallel to that of the second lens set and the both move synchronously;
the lens tube comprises one only first tube wall extended in the horizontal direction and providing with a first light transmission hole and a second light transmission hole, a second tube wall bent and extended from the circumference of the first tube wall and encircling the dual receiving space together with the first tube wall, and a third tube wall bent and extended from the middle part of the first tube wall and dividing the dual receiving space into the first receiving space and the second receiving space; the first lens set abuts against the first tube wall and/or the second tube wall and/or the third tube wall, and the second lens set abuts against the first tube wall and/or the second tube wall and/or the third tube wall;

the first tube wall, the second tube wall, and the third tube wall that together form the first receiving space and the second receiving space are only one-piece structure.

2. The dual-lens module as described in claim 1, wherein the first lens set and the second lens set are disposed symmetrically about the central axis of the third tube wall.

3. The dual-lens module as described in claim 1, wherein the first light transmission hole and the second light transmission hole are formed symmetrically at interval.

4. The dual-lens module as described in claim 1, wherein the structures of the first lens set and the second lens set are same.

5. Apparatus, comprising a housing and a dual-lens module received in the housing, wherein the dual-lens module is the one described in claim 1.

6. The apparatus as described in claim 5, wherein the first lens set and the second lens set are disposed symmetrically about the central axis of the third tube wall.

7. The apparatus as described in claim 5, wherein the first light transmission hole and the second light transmission hole are formed symmetrically at interval.

8. The apparatus as described in claim 5, wherein the structures of the first lens set and the second lens set are same.

9. The dual-lens module as described in claim 1, wherein each of the first lens set and the second lens set consists of a plurality of lenses.

* * * * *